United States Patent
Kakizaki

(10) Patent No.: US 8,379,250 B2
(45) Date of Patent: Feb. 19, 2013

(54) IMAGE PROCESSING APPARATUS CONFIGURED TO PROCESS WRITING PROCESSING INFORMATION

(75) Inventor: Sohei Kakizaki, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1087 days.

(21) Appl. No.: 12/346,958

(22) Filed: Dec. 31, 2008

(65) Prior Publication Data

US 2009/0180145 A1    Jul. 16, 2009

(30) Foreign Application Priority Data

Jan. 11, 2008    (JP) .................. 2008-004684

(51) Int. Cl.
*G06F 15/00* (2006.01)
*G06F 3/12* (2006.01)
*G06K 1/00* (2006.01)

(52) U.S. Cl. ................... 358/1.15; 358/1.13

(58) Field of Classification Search ............. None
See application file for complete search history.

(56) References Cited

U.S. PATENT DOCUMENTS

| 7,111,121 B2 * | 9/2006 | Oishi et al. ............... 711/115 |
| 7,441,124 B2 * | 10/2008 | Hirasawa ................ 713/189 |
| 2006/0282472 A1 * | 12/2006 | Ng et al. ................ 707/200 |

FOREIGN PATENT DOCUMENTS

| JP | 7212707 A | 8/1995 |
| JP | 8138005 A | 5/1996 |
| JP | 2002318733 A | 10/2002 |
| JP | 2004-072762 A | 3/2004 |
| JP | 2007080246 A | 3/2007 |

* cited by examiner

Primary Examiner — Douglas Tran
(74) Attorney, Agent, or Firm — Panitch Schwarze Belisario & Nadel LLP

(57) ABSTRACT

An image processing apparatus is provided to include the information retrieving unit for retrieving writing processing information out of the external memorizing device, and the image processing apparatus turns out as to whether certain information is in a processing of writing by retrieving the writing processing information out of the external memorizing device. If it is turned out that the status is in a processing of writing, the corresponding information is automatically deleted. A user is not necessary to delete the writing failed file manually, so that the user's work load will be reduced.

9 Claims, 8 Drawing Sheets

IMAGE PROCESSING APPARATUS CONFIGURED TO PROCESS WRITING PROCESSING INFORMATION

BACKGROUND OF THE INVENTION

1. Field of the Invention

This invention relates to an image processing apparatus serving as a complex peripheral apparatus handling image data as cores to be processed, such as an MFP (Multifunctional Peripheral) having plural functions and, more particularly, to an image processing apparatus capable of processing information such as image data in use of an external memorizing device detachably attached thereto.

2. Description of Related Art

High speed and multi-functions are required for digital photocopiers these days, and digital hybrid machines come to be sold in market in which the machines have a scanner function, a facsimile function, and a printing function in addition to a photocopying function. A single high speed printer may be used via LAN connections in share with a relatively large number of people for word processing or image processing in, such as, e.g., factories or companies.

Where a user employs the scanner function of such as a digital photocopier, the user can process the image data read out of an original document using each user's personal computer connected via the LAN connection. For off-line processing in a personal computer not connected with the LAN, an art has been known in which image data read with a scanner function are stored temporarily in an external memorizing device such as, e.g., a memory card to be processed and in which a user easily can work upon bringing the image date with such an external memorizing device into a laptop type computer not connecting with the LAN after writing the data in the external memorizing device thus detachably attached (see, e.g., Japanese Unexamined Patent Publication No. 2004-72762).

The user, however, can always attach and detach the external memorizing device such as a memory card, and may detach the external memorizing device even during a period in a processing of writing information such as image data into the external memorizing device. In such a case, the data under writing may be damaged, resulting in failures of writing processing. Similar problems may occur in situations that the apparatus is turned off accidentally or by itself for some reasons. Files failed in writing frequently cannot be open on the application because those files are not yet completed as proper files, and such failed files become apparently useless for users. To delete such useless files, the user has to connect the external memorizing device including the failed files with an apparatus, such as, e.g., a personal computer having a function deleting files and manually has to execute deletion of writing failed files after searching such failed files, and therefore, the user's work would become burdensome.

A user may not be aware of existence of writing failed files, and if the user does other jobs as remaining those writing failed files in the external memorizing device, the failed files may depress an empty capacity of the device, thereby possibly rendering the device unable to store necessary files.

It is an object to provide an image processing apparatus capable of proceeding to subsequent jobs without being bothered with recovery work for users even where writing failed files are remained in such an external memorizing device.

SUMMARY OF THE INVENTION

The foregoing objects are accomplished with an image processing apparatus comprising: an information retrieving unit for retrieving writing processing information out of an external memorizing device detachably attached thereto storing the writing processing information; and an information deleting unit for deleting information corresponding to the information retrieved from the information retrieving unit.

According to an aspect of the invented image processing apparatus, the image processing apparatus is provided to include the information retrieving unit for retrieving writing processing information out of the external memorizing device, and the image processing apparatus turns out as to whether certain information is in a processing of writing by retrieving the writing processing information out of the external memorizing device. If it is turned out that the status is in a processing of writing, the corresponding information is automatically deleted. A user is not necessary to delete the writing failed file manually, so that the user's work load will be reduced.

In a preferred embodiment of the invented image processing apparatus, the image processing apparatus is provided to include an information display unit for displaying information corresponding to the information retrieved from the information retrieving unit. The image processing apparatus may includes an information writing unit for writing information to the external memorizing device, wherein the information writing unit writes information indicating a status in processing of writing with respect to the writing processing information before writing of the information, and changes the status from in processing of writing to in not processing of writing after completion of writing of the information.

Another image processing apparatus according to the invention, includes: an original document reading unit for reading an original document; an internal memorizing device installed within an apparatus housing; an information writing unit for writing data read at the original document reading unit to an external memorizing device detachably attached to the apparatus housing; an attaching detaching detection unit for detecting attachment and detachment of the external memorizing device; and an instructing unit for stopping, when the external memorizing device is detached from the apparatus housing, writing the data read to the external memorizing device at the information writing unit and making an instruction for writing a remainder of the data read into the internal memorizing device, wherein the information writing unit reads out the data written in the internal memorizing device and rewrites the data in the external memorizing device when the external memorizing device is detected as attached to the apparatus housing.

According to the image processing apparatus, the external memorizing device is configured so that detachment thereof is detected by the attaching detaching detection unit, and where the attaching detaching detection unit detects that the external memorizing device is detached from the apparatus housing, writing the data read to the external memorizing device at the information writing unit is stopped according to an instruction from the instruction unit, and remainder of the data is read into the internal memorizing device. Thus, the internal memorizing device can store the read data instead of the external memorizing device, and where the external memorizing device is attached again to the apparatus housing, the entire data can be prevented from receiving damages by transferring the data stored in the internal memorizing apparatus to the external memorizing apparatus.

According to the image processing apparatus of the invention, the apparatus can detect as to whether the prescribed responding information is in a status in processing of writing, and if the information is in the status in processing of writing, the responding information is automatically deleted. The user therefore does not need to delete the writing failed file manually, so that user's burden will be reduced. That is, even where any writing failed file is left in the external memorizing device, the user can use the external memorizing device as it is, thereby improving the efficiency of data reading work.

According to the other image processing apparatus of the invention, the internal memorizing device, in lieu of the external memorizing apparatus, can store the read data and where the external memorizing device is attached again to the apparatus housing, the entire data can be prevented from receiving damages by transferring the data stored in the internal memorizing apparatus to the external memorizing apparatus.

BRIEF DESCRIPTION OF THE DRAWINGS

This invention may take physical form in certain parts and arrangements of parts, a preferred embodiment and method of which will be described in detail in this specification and illustrated in the accompanying drawings which form a part hereof, and wherein.

DETAILED DESCRIPTION OF PREFERRED EMBODIMENTS

First Embodiment

Figure 1:
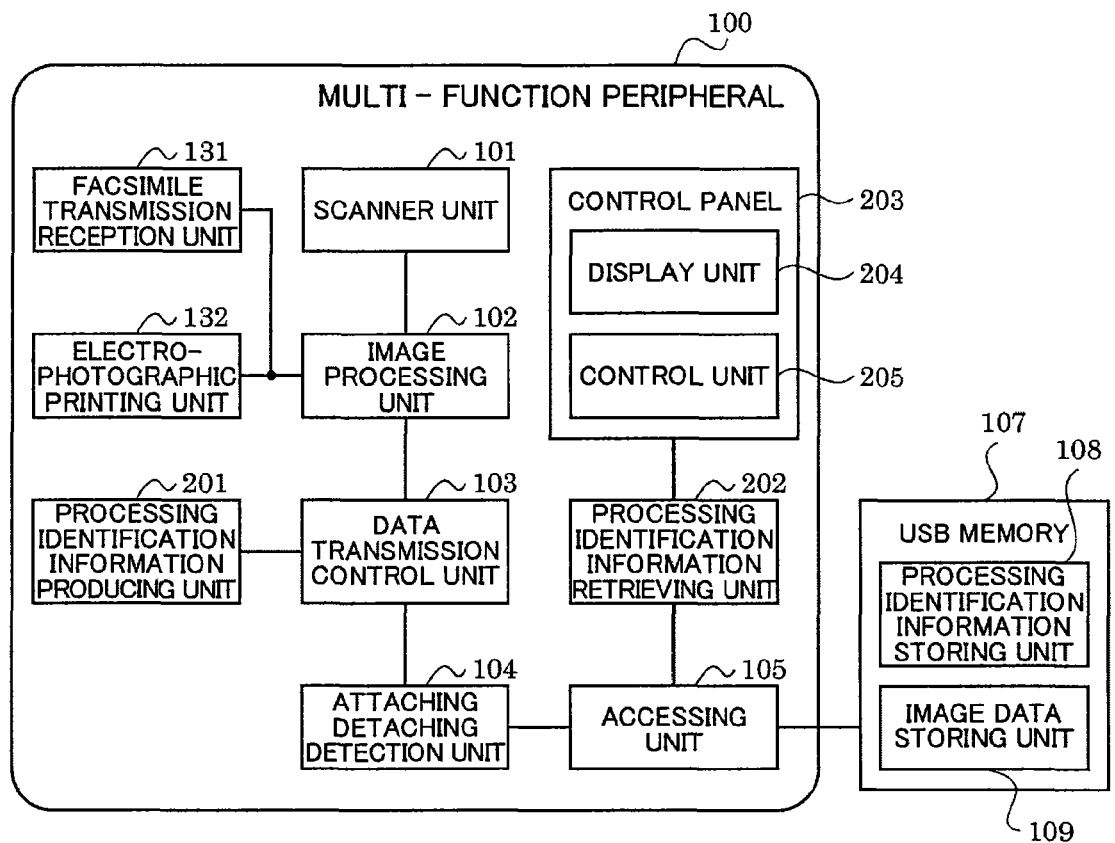
FIG. 1 is a block diagram showing a system structure of a multi-function peripheral according to a first embodiment of the invention.
Figure 2:
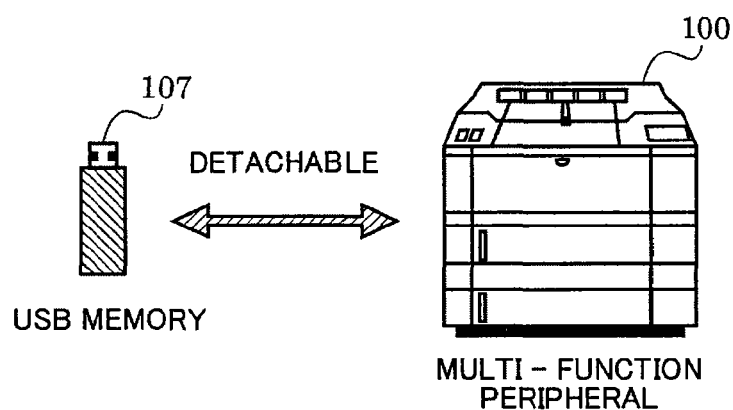
FIG. 2 is a diagram showing a USB memory and the multi-function peripheral according to a first embodiment of the invention.

FIG. 1 is a block diagram showing a structure of a multi-function peripheral serving as an image processing apparatus according to the first embodiment of the invention. The multi-function peripheral 100 includes a scanner unit 101 for reading original documents, an image processing unit 102 for processing image data transmitted from the scanner unit 101 or other units, a data transmission control unit 103 for controlling execution of writing, an attaching detaching detection unit 104 for detecting as to where a USB (Universal Serial Bus) memory 107 is attached to a peripheral body serving as an apparatus housing, and an accessing unit 105 having a function as a USB interface. The multi-function peripheral 100 further includes a processing identification information producing unit 201 connecting to the data transmission control unit 103, a processing identification information retrieving unit 202 functioning as information retrieving means for retrieving writing processing information, and a control panel 203 having a display unit 204 functioning as information displaying means displaying information corresponding to the retrieved writing processing information. It is to be noted that the multi-function peripheral 100 of this embodiment include in addition to the scanner function, a facsimile transmission and reception unit 131 for performing facsimile function, and an electrophotographic printing unit 132 for printing, and as shown in FIG. 2, the USB memory 107 serving as an external memorizing device can be detachably attached to the multi-function peripheral 100 of this embodiment.

More specifically, the scanner unit 101 for reading original documents is an apparatus for reading original documents set on the multi-function peripheral's feeder such as an ADF (Automatic Document Feeder) for paper or set on a glass surface for scanning original documents, and is an apparatus for outputting an electrical signal at an image sensor in reflecting original documents' images upon radiating light out of an exposure lamp or the like to produce prescribed image data. The image processing unit 102 is a signal processing unit for converting the image data read out at the scanner unit 101 into printing data printable or data in a format storable in the USB memory 107. The image processing unit 102 is a processing unit converting an analog signal from the scanner unit 101 into a digital signal and processing data in a prescribed way of expansion or compression, such as, e.g., edge emphasis, trimming, and page assignment with respect to the digital image signal.

The data transmission control unit 103 is a controller for controlling execution of writing, stop of writing, and setting as to where to write, with respect to the image data processed in the image processing unit 102. The data transmission control unit 103 is connected to the processing identification information producing unit 201, and makes a processing on the processing identification information in relation to the corresponding image data. The processing identification information producing unit 201 has a function producing processing identification information when writing the image data to the USB memory 107, and in this embodiment, the processing identification information is composed of file name 110, storing destination information 111, and writing processing flag 112, as shown as an example in FIG. 4. The file name 110 is a name where the corresponding image data are presented in a file format, and is given automatically by, e.g., CPU or made by typing input done by the user. The storing destination information 111 is the destination for storing the image data, and in this embodiment, information indicating the USB memory 107 is given to the storing destination information 111 where the USB memory 107 is attached and where the system executes the ScanToUSB memory processing as described below. The writing processing flag 112 is a flag indicating as to whether writing of the corresponding file is completed at the storing destination or not; if the data of one bit indicate "1", it shows "writing is processing"; if the data of one bit indicate "0", it shows "writing is not processing."

The attaching detaching unit 104 has a function detecting whether the USB memory 107 is attached to the multi-function peripheral 100 or not as well as whether the USB memory 107 is detached or not. The USB memory 107 is used as it is being inserted into a terminal without turning off the power of the multi-function peripheral 100, or namely from a so-called "hot plug" function, and when the USB memory 107 is attached to the multi-function peripheral 100, information corresponding to the USB memory 107 to be stored in the storing destination information in the processing identification information producing unit 201, or namely information that the storing destination is the USB memory 107, can be selected. The accessing unit 105 is an interface unit outputting, to the USB memory 107, image data converted at the image processing unit 102 and retrieving the processing identification information from the USB memory 107, and in this embodiment a USB interface is used. It is to be noted that if a memory card is used in lieu of such a USB memory, a card slot corresponding the memory card becomes the interface unit.

Figure 4:
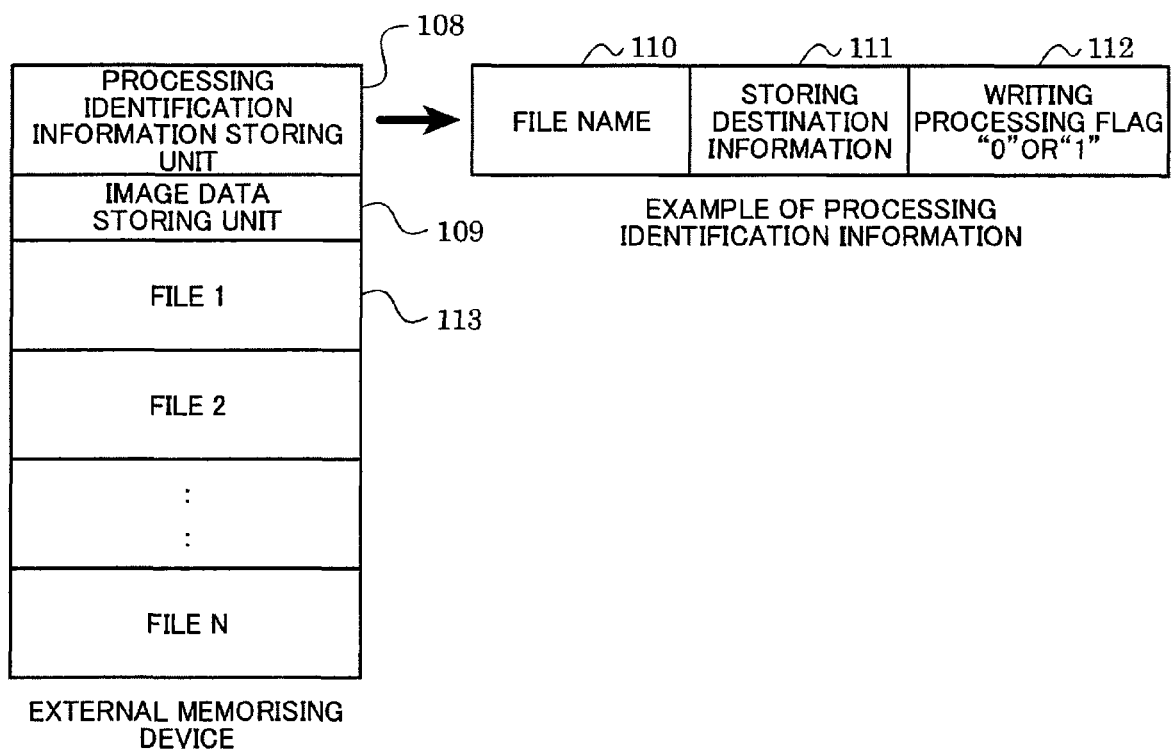
FIG. 4 is a diagram showing a memory map of a USB memory used for the multi-function peripheral according to the first embodiment of the invention.

The processing identification information retrieving unit 202 retrieves processing identification information corresponding to the image data out of a processing identification information storing unit 108. As shown in FIG. 4, the processing identification information corresponding to the image data is made of a combination of the file name 110, the storing destination information 111, and the writing processing flag 112, and the processing identification information retrieving unit 202 checks as to whether the bit of the writing processing flag 112 is "0" or "1", the processing identification information 202 recognizes existence of one or more writing failed files. The timing that the processing identification information retrieving unit 202 checks the status of the writing processing flag 112 is immediately after the USB memory 107 is attached to the multi-function peripheral 100. If the writing processing flag is "1" indicating processing of writing at that time, the processing is started as the writing failed file exists. If the writing processing flag is "0" at the same timing, the processing is proceeded as having no problem.

The control panel 203 is made of a display unit 204 formed of a simple display device such as, e.g., LCD (liquid crystal display), and a control unit 205 having ten keys and other buttons. The display unit 204 and the control unit 205 are formed on a surface of the housing body of the multi-function peripheral 100. The display unit 204 functions as information displaying means for displaying information corresponding to the writing processing information. The display unit 204 and the control unit 205 can be formed of a liquid crystal touch panel, and can be used commonly with panels for controlling printing, facsimile, and photocopying functions. The control unit 205 may have an independent key entry unit. With this embodiment, the display unit 204 displays a message when the processing identification information retrieving unit 202 proceeds for processing as the writing failed file exists.

Figure 6:
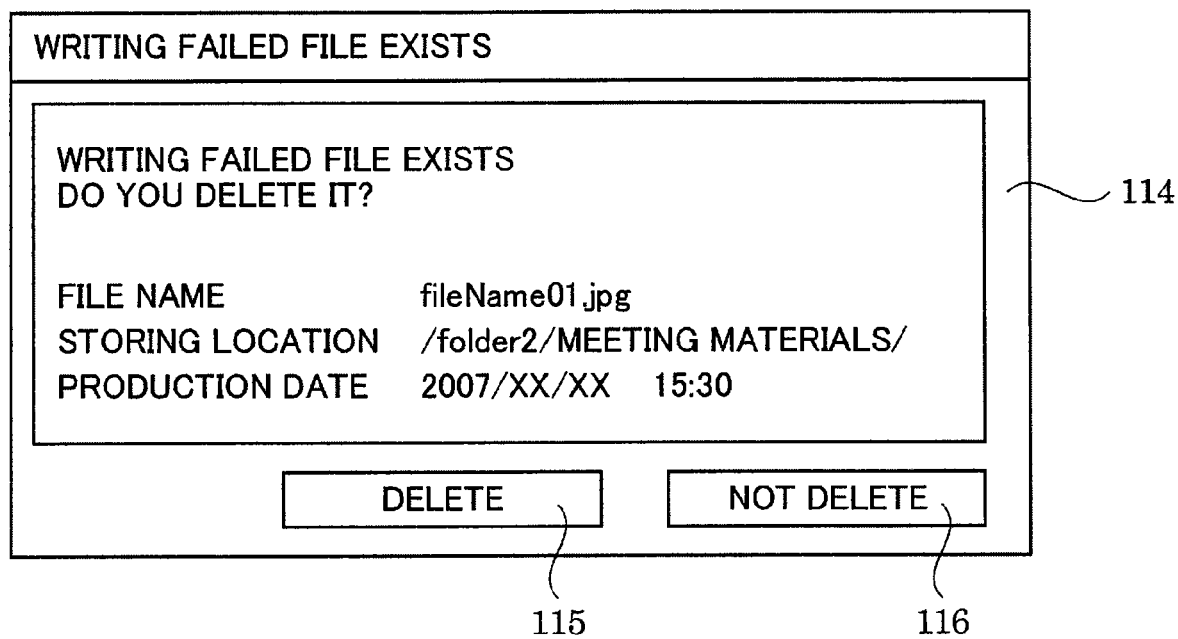
FIG. 6 is a screen illustration showing a display example of a display panel of the multi-function peripheral according to the first embodiment of the invention in a case where a writing failed file exists.

FIG. 6 is a displaying example where such a writing failed file exists. A message of "writing failed file exists" is displayed at a top portion on a screen 114 of the display panel, and a word or phrase of "Delete?" is displayed to show that the system of the multi-function peripheral 100 is in a state that the system can accept an instruction of deletion. The file name "fileName01.jpg" is shown on the screen 114 of the display panel, and "folder2/meeting material/" is also displayed as a stored location, so that the user can be informed of existence of the writing failed file of the displayed file name at the displayed location. The screen 114 of the display panel displays the composing date, e.g., "2007/xx/xx 15:30", which is a display for indicating the timing of starting production of the corresponding writing failed file recorded. A deletion button 115 indicating "delete" and a non-deletion button 116 indicating "not delete" are made to appear at a lower side of the screen 114 of the display panel, and one of the buttons can be selected. When the writing failed file is to be deleted, the deletion button 115 is selected to delete the file having the file name of "fileName01.jpg" in the USB memory 107 and its location of "folder2/meeting material/".

What is connected to the multi-function peripheral 100 thus formed is the USB memory 107 serving as an external memorizing device storing the writing processing information, and in this embodiment, the USB memory 107 includes the processing identification information storing unit 108 and an image data storing unit 109. As shown in FIG. 2, the USB memory 107 is detachably attached to the multi-function peripheral 100. More specifically, a B-terminal of the USB, not shown, is formed as to face to a surface of the apparatus housing of the multi-function peripheral 100, and when an A-terminal of the USB memory 107 is connected to the B-terminal, the USB memory 107 is connected to the multi-function peripheral 100 without turning off the power of the peripheral in a way as so-called "hot plug," and the USB memory 107 can be disconnected without turning off the power. It is to be noted that the USB memory 107 is exemplified as the external memorizing device in this embodiment but such an external memorizing device should be interpreted with broader meaning. For example, various electronic apparatuses such as, e.g., a memory apparatus mounting an HDD (hard disc drive) to be attached externally and connectable via a USB connection, an apparatus having a memory function normally used specially for music or watching media, and a digital camera, can be used for the external memorizing device. As other external memorizing device for other embodiments of the invention, it is not limited to a memory having USB connection capability, and the memory device can be a memorizing media in a card type or chip type, such as, e.g., a memory card. With applications according to this invention, connection between the external memorizing device and the multi-function peripheral can be wired or wireless, and includes connections via network or networks using LAN connection or WAN (Wide Area Network) connection. FIG. 4 shows a memory map of the USB memory 107; in a memory region 113, the processing identification information storing unit 108 and the image data storing unit 109 do storing each files. The processing identification information storing unit 108 stores data of the file name 110, the storing destination information 111, and the writing processing flag 112.

The USB memory 107 can be physically attached by the users at any time to the multi-function peripheral 100, and can be detached. When the system does not allow detachment of the memory during, e.g., processing of writing, the user may inadvertently detach the USB memory in fact. A writing failed file may be left in the USB memory in case of sudden power-off due to thunder or the like. With conventional multi-function peripherals, a broken file that cannot be deleted at the peripheral is remained in case that the user inadvertently detaches the USB memory or that writing is stopped at the USB memory due to sudden power-off or the like, and therefore, it is necessary to re-insert the USB memory 107 to, e.g., a personal computer to delete the broken file. With the multi-function peripheral 100 according to the embodiment, the USB memory is not required to insert to any apparatus such as, e.g., personal computer because this apparatus works as following procedures.

Figure 3:
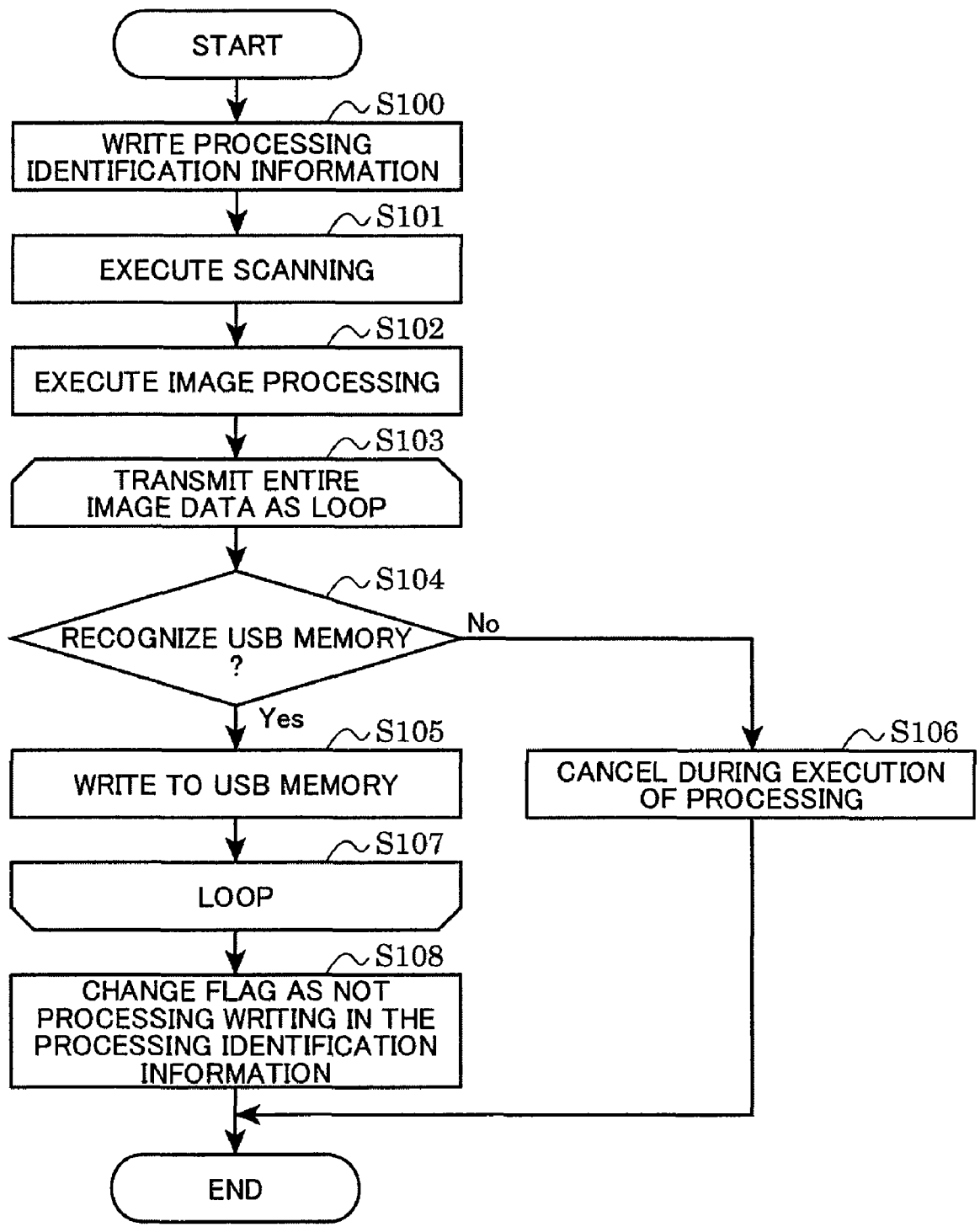
FIG. 3 is a flowchart of ScanToUSB memory processing done in the multi-function peripheral according to the first embodiment of the invention.

Referring now to FIG. 3, a flow for executing work called as ScanToUSB memory processing in the multi-function peripheral 100 according to the embodiment is described. First, a user manipulates to start the ScanToUSB memory processing. When the ScanToUSB memory processing begins, the processing identification information is produced with the processing identification information producing unit 201 at step S100. This processing identification information is for providing identification information in the system for scanning operation, which is conducted subsequently. The processing identification information is made of the combination of the file name 110, the storing destination information 111, and the writing processing flag 112 as shown in FIG. 4. The processing identification information can includes, in addition to above, information such as, e.g., time of production and renewal with respect to files, and in this regard, the processing identification information is the same as normal image data files. The processing identification information produced at the processing identification information producing unit 201 is transmitted to the data transmission control unit 103 and is temporally stored at the unit 103. The writing processing flag 112 among data of the processing identification information is produced as to be "1" indicating "processing of writing" because writing operation is to start with respect to the USB memory 107.

Subsequently, original documents set on the scanner unit 101 are read (step S101). In this step, a signal corresponding to the set original documents generated with an image sensor equipped at the scanner unit 101 is sent to the image producing unit 102. Image processing is then executed at step S102 to convert the signal about the read image into data in a storable format that the user wants. At that time, data, as image file formats, can be converted into some file formats widely used for personal computers such as, e.g., bitmap, JPEG, GIF, PDF. Data are also not limited to those and can be converted to original formats. Users may give information such as, e.g., file size, color information, enlargement or reduction in size, page, grayscale, but with this multi-function peripheral, the USB memory 107 may include those data of the image processing information, and those can be read to be used for processing.

At step S103, the data are transmitted. This data transmission is for transmitting image data toward the USB memory 107 in accompany with the processing identification information that have been produced at the processing identification information producing unit 201. Normally, a specific transmission size is predetermined where image data are transmitted to a memory device, and therefore, image data are sent by each in the predetermined size, so that the transmissions are repeated by each in the predetermined size as a loop up to the completion of transmission of the entire image data. At that time, the processing identification information produced at the processing identification information producing unit 201 can be sent as a firstly sent data likewise a header in a signal format. A memory functioning as a buffer can be temporarily used for the transmission destination.

At step S104, it is confirmed that the USB memory 107 is recognized using a signal from the attaching detaching detection unit 104. Where the recognition of the USB memory 107 is confirmed (yes), or in other words, where the USB memory 107 is physically as well as electrically connected to the multi-function peripheral 100, writing is made to the recognized USB memory 107 (step S 105). The processing identification information that have been produced at the processing identification information producing unit 201 is transmitted to the processing identification information storing unit 108 at an initial stage of writing to the USB memory 107, and the USB memory 107 stores "1" indicating processing of writing as a stored value of the writing processing flag 112 among data of the processing identification information.

The writing processing of the image data done in the USB memory 107 is executed according to the loop step S107 because this writing processing becomes repetitive processing work. Where the loop step S107 finishes, the transmission of the entire image data to the image data storing unit 109 is completed, thereby ending the writing processing. Subsequently, the stored value of the writing processing flag 112 among the data of the processing identification information in the USB memory 107 is switched from "1" to "0". As described above, where the stored value of the writing processing flag 112 is "0", the data indicate a status of not processing of writing, and this switching operation shows that the writing is completed properly. Such renewal of the processing identification information in the USB memory 107 can be made by data transmission sent again from the processing identification information producing unit 201 or by inclusion of a signal for automatic renewal at the end of the image data to be sent.

Although the flow at steps S105, S107, and S108 shows a streamline in a case where writing to USB memory 107 ends in an ordinary manner. If a user pulls out the USB memory 107, this causes canceling during execution of processing as shown at step S106. In such a case, the attaching detaching detection unit 104 recognizes that the USB memory 107 is pulled out, and the system stops this ScanToUSB memory processing. A writing failed file is left on a side of the USB memory 107 at that time, but in the multi-function peripheral 100 according to the embodiment, the existence of the writing failed file is recognized at a time when the USB memory 107 is attached again to the apparatus housing, and is displayed. Upon choosing the button for deletion, the writing failed file can be deleted.

Figure 5:
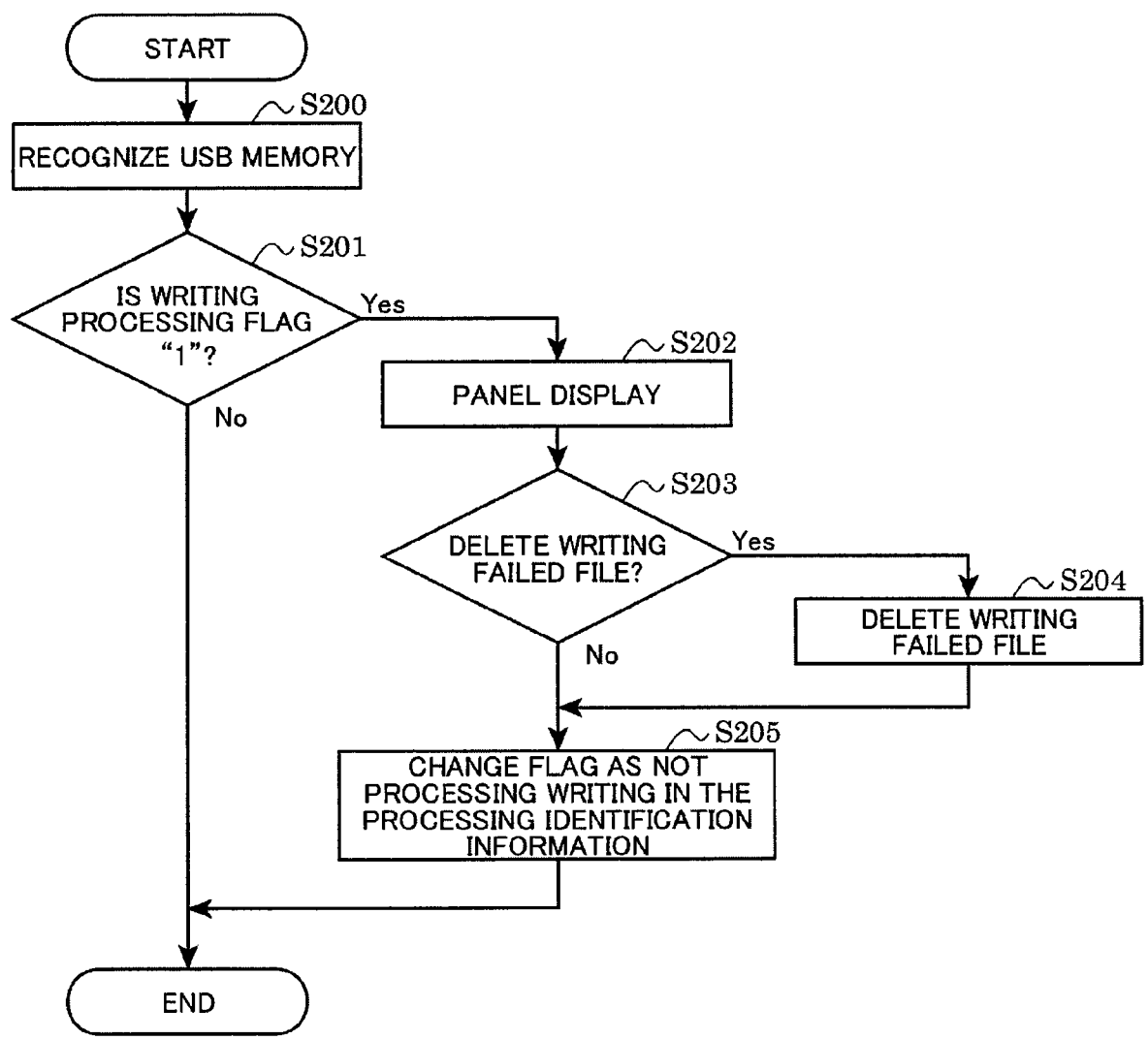
FIG. 5 is a flowchart showing a deletion processing of a writing failed file in the multi-function peripheral according to the first embodiment of the invention.

Referring to FIG. 5, a deletion processing of a writing failed file in the embodiment is described. The deletion processing of the writing failed file is normally a processing executed immediately after the USB memory 107 is connected to the multi-function peripheral 100. If any writing failed file is left in the USB memory 107, the memory region is used in a wasting manner for that portion, and in some cases, an adequate memory region cannot be obtained. Upon executing the deletion processing of the writing failed file, the region used uselessly can be extinguished.

As shown in FIG. 5, a judgment is first made as to whether the USB memory 107 is connected to the multi-function peripheral 100, and step S200 shows a procedure in which the USB memory 107 is recognized as connected to the multi-function peripheral 100. Where the USB memory 107 is not connected, the USB memory 107 is not recognized, and the respective steps in the flow shown in FIG. 5 do not occur. The processing identification information retrieving unit 202 serving as information retrieving means for retrieving writing processing information, operates to retrieve the stored value in the writing processing flag 112 of the processing identification information storing unit 108 in the USB memory 107, and it is judged as to whether the stored value of the writing processing flag is "1" or not (step S201). The stored value of the writing processing flag 112 in the processing identification information storing unit 108 is either "1" indicating processing of writing or "0" indicating not processing of writing. If the writing processing flag 112 is "1" indicating processing of writing (yes), the processing goes on as a writing failed file exists. If the writing processing flag 112 is "0" indicating not processing of writing (no), the processing is made to end.

Where the writing processing flag 112 is "1" indicating processing of writing (yes), the screen is made to show a message indicating this (step S202). That is, displaying operation is made as shown in FIG. 6 as described above, and a prescribed display is made at the display unit 204 of the control panel 203 according to the signal from the processing identification information retrieving unit 202. More specifically, the screen 114 of the display panel displays a message "writing failed file exists" at an upper portion as shown in FIG. 6, and displays a message "Do you delete it?", so that the system of the multi-function peripheral 100 is shown as in a state receivable of an instruction of deletion. The screen 114 of the display panel also shows "fileName01.jpg" as the file name and "folder2/meeting material/" as the shoring location, and the system shows that a writing failed file having the displayed file name at the displayed location exists. The screen 114 of the display panel yet further shows the producing date of "2007/xx/xx 15:30", which displays the timing of the recorded production start of the writing failed file. The deletion button 115 indicating "delete" and the non-deletion button 116 indicating "not delete" are made to appear at the lower side of the screen 114 of the displaying panel, and the user can choose either buttons. It is to be noted that the displayed example shown in FIG. 6 is not more than one example, and can be other display types. For example, the screen can be of a display type having light emitting diodes indicating existence of the writing failed file by the diodes' turning on, or the system can be structured to inform of the existence of the writing failed file to user's address by email or the like.

Step S203 is a step at which either one of the deletion button 115 indicating "delete" and the non-deletion button 116 indicating "not delete" is entered, and if the user selects the button of "not delete" (no), the writing failed file is not deleted, the program step goes to step S205. If the user chooses the deletion button 115 indicating "delete", the program step goes to step S204. The writing failed file corresponding to the file name "filename01.jpg" in the example shown in FIG. 6, which is displayed on the screen 114 of the display panel, is then deleted. The program step goes to step S205 after this deletion of the writing failed file. The writing processing flag 112 of the processing identification information is renewed from the value "1" indicating processing of writing to the value "0" indicating not processing of writing. With this status change of the flag, no writing failed file exists to be deleted for the user in the USB memory 107.

According to the flow shown in FIG. 5, with the multi-function peripheral 100, the deletion processing of the writing failed file is executed immediately after the USB memory 107 is connected to the multi-function peripheral 100. It is therefore unnecessary for the user to manipulate deletion by inserting the USB memory to a personal computer to delete the writing failed file, so that the useless file can be deleted surely in a short time. For example, where plural multi-function peripherals 110 are installed in the same area, it is not necessary to render the multi-function peripheral 100 creating a result of failed writing identical to the multi-function peripheral 100 performing deletion of the writing failed file for recovery work, and any other multi-function peripherals can perform such deletion.

It is to be noted that although the processing identification information is written into the USB memory after the original document is read in the ScanToUSB memory processing as described above, the original document can be read after processing identification information including writing processing flag data having the value "1" meaning processing of writing is first written in the USB memory.

Second Embodiment

Figure 7:
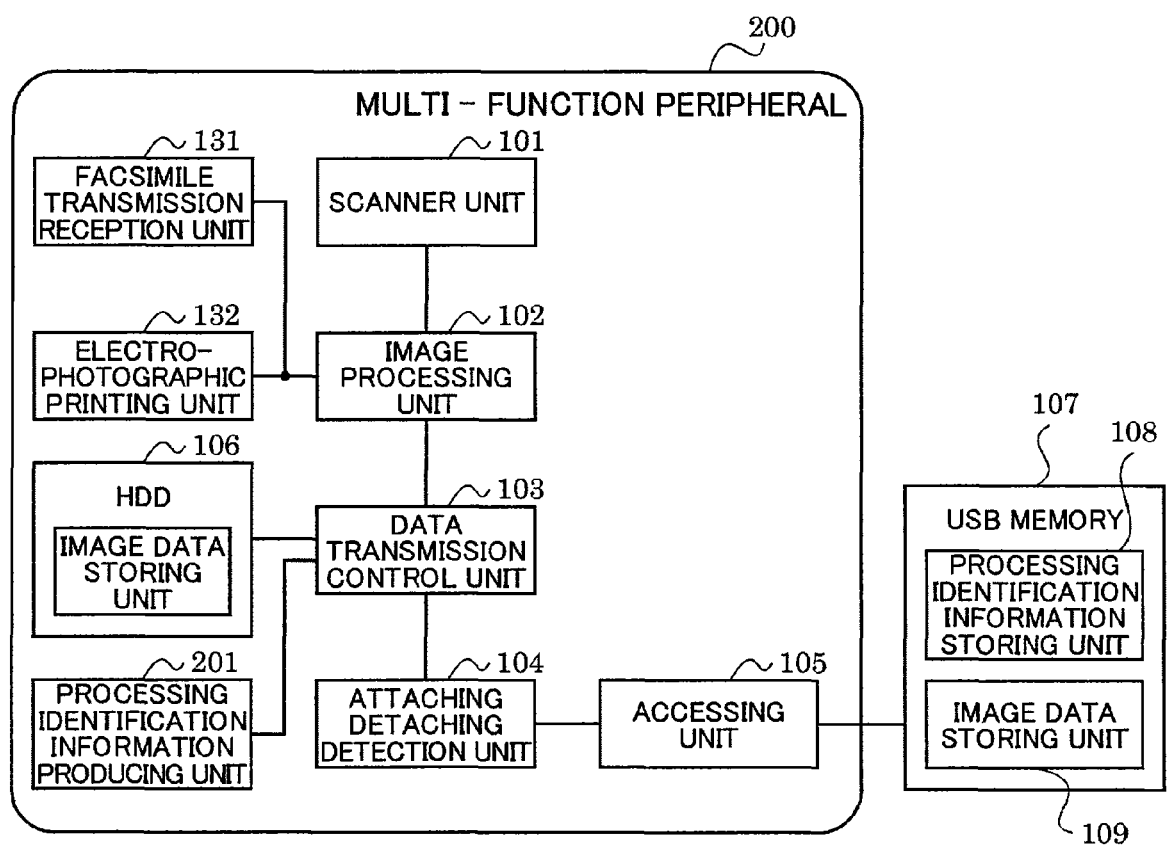
FIG. 7 is a block diagram showing a system structure of a multi-function peripheral according to a second embodiment of the invention.

FIG. 7 is a block diagram showing a structure of the multi-function peripheral 200 serving as an image processing apparatus according to the second embodiment of the invention. The same reference numbers are assigned to respective members of the multi-function peripheral 200 in this embodiment, which are substantially the same to the respective member of the multi-function peripheral 100 in the first embodiment. The multi-function peripheral 200 includes a scanner unit 101 for reading original documents, an image processing unit 102 for processing image data transmitted from the scanner unit 101 or other units, a data transmission control unit 103 for controlling execution of writing, an attaching detaching detection unit 104 for detecting as to where a USB (Universal Serial Bus) memory 107 is attached to a peripheral body serving as an apparatus housing, an accessing unit 105 having a function as a USB interface, and an internal HDD 106 (Hard Disc Drive) serving as an internal memorizing device connected to the data transmission control unit 103. It is to be noted that the multi-function peripheral 200 of this embodiment includes in addition to the scanner function, a facsimile transmission and reception unit 131 for performing facsimile function, and an electrophotographic printing unit 132 for printing, and in substantially the same manner as the multi-function peripheral 100 in the first embodiment as shown in FIG. 2, the USB memory 107 serving as an external memorizing device can be detachably attached to the multi-function peripheral 200 of this embodiment.

More specifically, the scanner unit 101 for reading original documents is an apparatus for reading original documents set on the multi-function peripheral's feeder such as an ADF (Automatic Document Feeder) for paper or set on a glass surface for scanning original documents, and is an apparatus for outputting an electrical signal at an image sensor in reflecting original documents' images upon radiating light out of an exposure lamp or the like to produce prescribed image data. The image processing unit 102 is a signal processing unit for converting the image data read out at the scanner unit 101 into printing data printable or data in a format storable in the USB memory 107. The image processing unit 102 is a processing unit converting an analog signal from the scanner unit 101 into a digital signal and processing data in a prescribed way of expansion or compression, such as, e.g., edge emphasis, trimming, and page assignment with respect to the digital image signal.

The data transmission control unit 103 functions as a controller for controlling execution of writing, stop of writing, and setting as to where to write, with respect to the image data processed in the image processing unit 102. The data transmission control unit 103 is connected to the internal HDD 106 (Hard Disc Drive) serving as an internal memorizing device, and has a structure capable of transmitting data to the HDD 106. The attaching detaching unit 104 has a function detecting whether the USB memory 107 is attached to the multi-function peripheral 100 or not as well as whether the USB memory 107 is detached or not. The USB memory 107 is used as it is being inserted into a terminal without turning off the power of the multi-function peripheral 200, or namely from a so-called "hot plug" function, and when the USB memory 107 is attached to the multi-function peripheral 200, the attachment is detected to make the USB memory as one of selectable destination of the data. The accessing unit 105 is an interface unit outputting, to the USB memory 107, image data converted at the image processing unit 102 and retrieving the necessary information from the USB memory 107, and in this embodiment a USB interface is used. It is to be noted that if a memory card is used in lieu of such a USB memory, a card slot corresponding the memory card becomes the interface unit.

The data transmission control unit 103 is further connected to the processing identification information producing unit 201, and makes a processing on the processing identification information in relation to the corresponding image data. The processing identification information producing unit 201 has a function producing processing identification information when writing the image data to the USB memory 107, and in this embodiment, the processing identification information is composed of file name, storing destination information, and writing processing flag. The file name is a name where the corresponding image data are presented in a file format, and is given automatically by, e.g., CPU or made by typing input done by the user. The storing destination information is the destination for storing the image data, and in this embodiment, information indicating the USB memory 107 is given to the storing destination information 111 where the USB memory 107 is attached and where the system executes the ScanToUSB memory processing as described below. The writing processing flag is a flag indicating as to whether writing of the corresponding file is completed at the storing destination or not; if the data of one bit indicate "1", it shows "writing is processing"; if the data of one bit indicate "0", it shows "writing is not processing."

With this embodiment, the image data are stored upon assignments of page numbers corresponding to the respective pages. The assignments of the corresponding page numbers are made in a manner to sequentially assign each page number to prescribed data with the data transmission control unit 103. The multi-function peripheral 200 of this embodiment can manage against damaged data in the pages as described below by this method for storing image data.

What is connected to the multi-function peripheral 200 thus formed is the USB memory 107 serving as an external memorizing device storing the writing processing information, and in this embodiment, the USB memory 107 includes the processing identification information storing unit 108 and an image data storing unit 109 in substantially the same manner as in the first embodiment. The USB memory 107 is detachably attached to the multi-function peripheral 200. More specifically, a B-terminal of the USB, not shown, is formed as to face to a surface of the apparatus housing of the multi-function peripheral 100, and when an A-terminal of the USB memory 107 is connected to the B-terminal, the USB memory 107 is connected to the multi-function peripheral 100 without turning off the power of the peripheral in a way as so-called "hot plug," and the USB memory 107 can be disconnected without turning off the power. Although the USB memory 107 is exemplified as the external memorizing device in this embodiment, other memory cards or electronic apparatuses can be used, and connection between the external memorizing device and the multi-function peripheral can be wired or wireless and includes connections via network or networks using LAN connection or WAN (Wide Area Network) connection, as in substantially the same manner as those in the first embodiment.

The USB memory 107, in substantially the same manner as in the first embodiment, can be physically attached by the users at any time to the multi-function peripheral 200, and can be detached. When the system does not allow detachment of the memory during, e.g., processing of writing, the user may inadvertently detach the USB memory in fact. A writing failed file may be left in the USB memory in case of sudden power-off due to thunder or the like. With conventional multi-function peripherals, a broken file that cannot be deleted at the peripheral is remained in case that the user inadvertently detaches the USB memory or that writing is stopped at the USB memory due to sudden power-off or the like, and therefore, it is necessary to re-insert the USB memory 107 to, e.g., a personal computer to delete the broken file. With the multi-function peripheral 200 according to the embodiment, the USB memory is not required to insert to any apparatus such as, e.g., personal computer because this apparatus works as following procedures. Moreover, with the multi-function peripheral 200, in a case where a file is damaged in a midway of a page, the data are stored from the incident page by the substituted HDD 106 serving as the internal memorizing device, and at a time that the USB memory 107 is under recovery, the system performs an effective recovery from the data damaged at the midway of the page by transmitting the data out of the HDD 106.

Figure 8:
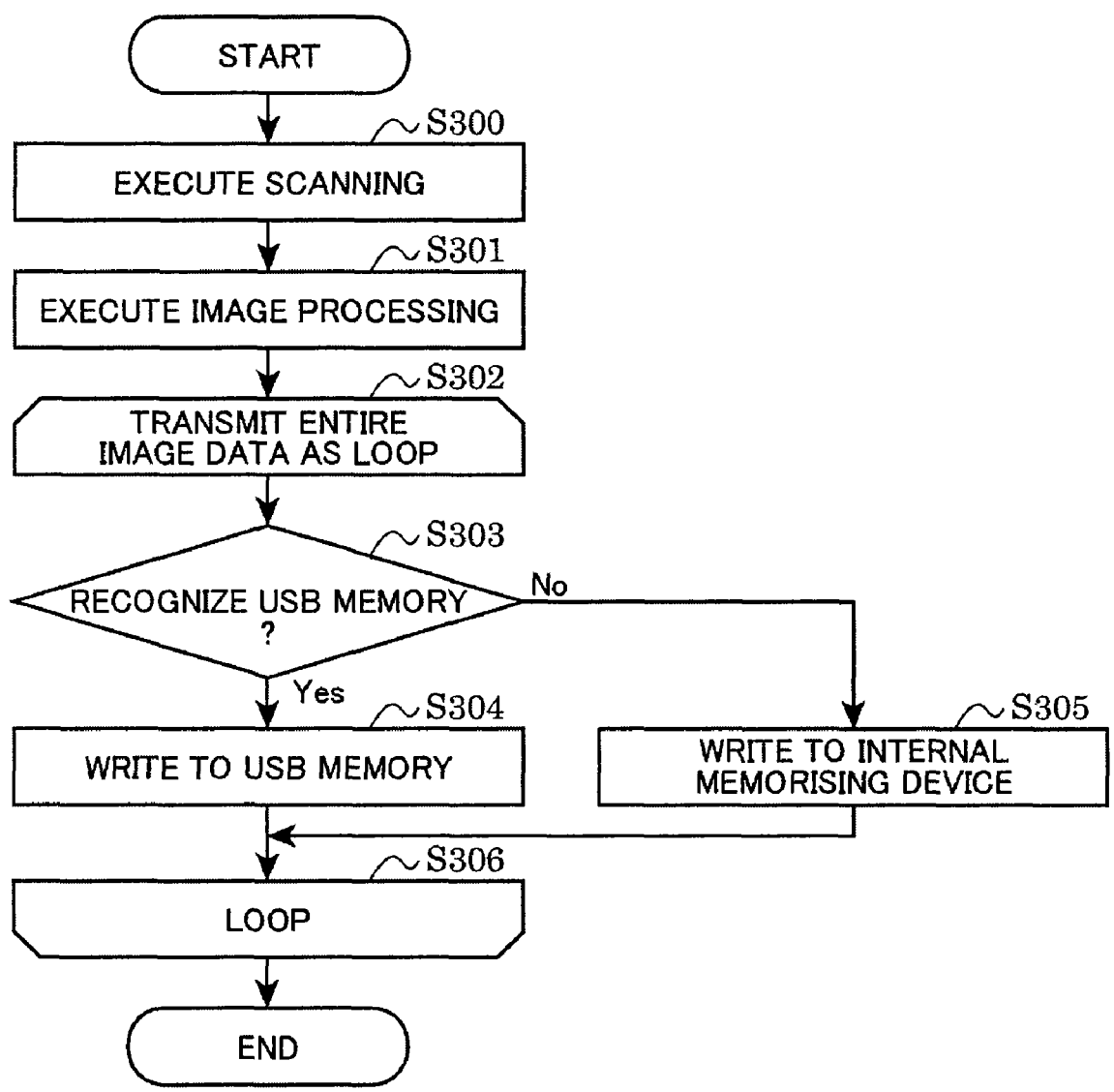
FIG. 8 is a flowchart of ScanToUSB memory processing done in the multi-function peripheral according to the second embodiment of the invention.

Referring now to FIG. 8, a flow for executing work called as ScanToUSB memory processing in the multi-function peripheral 200 according to the embodiment is described. First, a user manipulates to start the ScanToUSB memory processing. When the ScanToUSB memory processing begins, the original documents set to the scanner unit 101 are read at step S300. In this step, a signal corresponding to the set original documents generated with an image sensor equipped at the scanner unit 101 is sent to the image producing unit 102. The processing identification information made of the combination of the file name, the storing destination information, and the writing processing flag is produced with the processing identification information producing unit 201 at that step. The writing processing flag among data of the processing identification information is particularly produced as to be "1" indicating "processing of writing" because writing operation is to start with respect to the USB memory 107.

Image processing is then executed at step S301 to convert the signal about the read image into data in a storable format that the user wants. At that time, data, as image file formats, can be converted into some file formats widely used for personal computers, and data are also not limited to those and can be converted to original formats. Users may give information such as, e.g., file size, color information, enlargement or reduction in size, page, grayscale, but with this multi-function peripheral, the USB memory 107 may include those data of the image processing information, and those can be read to be used for processing.

At step S302, the data are transmitted. This data transmission is for transmitting image data toward the USB memory 107 in accompany with the processing identification information that have been produced at the processing identification information producing unit 201. Normally, a specific transmission size is predetermined where image data are transmitted to a memory device, and therefore, image data are sent by each in the predetermined size, so that the transmissions are repeated by each in the predetermined size as a loop up to the completion of transmission of the entire image data. At that time, the processing identification information produced at the processing identification information producing unit 201 can be sent as a firstly sent data likewise a header in a signal format. In this embodiment, the page number corresponding to the pages of the image data are added as additional information at the transmission of the image data, and are added to, e.g., the header portion of each page. Where the page numbers are already added on the data format at the transmission of the image data, it is unnecessary to add further any page number, and the information on the page number in the data format can be used as it is.

At step S303, it is confirmed that the USB memory 107 is recognized using a signal from the attaching detaching detection unit 104. Where the recognition of the USB memory 107 is confirmed (yes), or in other words, where the USB memory 107 is physically as well as electrically connected to the multi-function peripheral 200, writing is made to the recognized USB memory 107 (step S304). The processing identification information that have been produced at the processing identification information producing unit 201 is transmitted to the processing identification information storing unit 108 at an initial stage of writing to the USB memory 107, and the USB memory 107 stores "1" indicating processing of writing as a stored value of the writing processing flag. Hereinafter, the same operation is executed in a loop processing (S306), and writing into the USB memory 107 is made to go on as always confirming the USB memory 107. Even if the existence of the USB memory 107 is confirmed at first during the ScanToUSB memory processing, the USB memory 107 may be pulled out in a midway, and in such a case, the system makes processing as the condition at step S303 becomes "No" at that time.

It is confirmed as to whether the USB memory 107 is recognized using the signal from the attaching detaching detection unit 104. If communications with the USB memory 107 are cut off due to a reason such that the USB memory 107 is physically pulled out of the multi-function peripheral 200, recognition on the USB memory 107 cannot be confirmed (No). In such as case, the program step goes to step S305, and the data are written into the HDD 106 serving as the internal memory device. Hereinafter, the same operation is executed with the loop processing (S306), and thereby, the data are further written into the HDD 106. Writing the image data into the HDD 106 corresponds to information on the page numbers as described above, and this writing operation is described with reference to FIG. 9.

Figure 9:
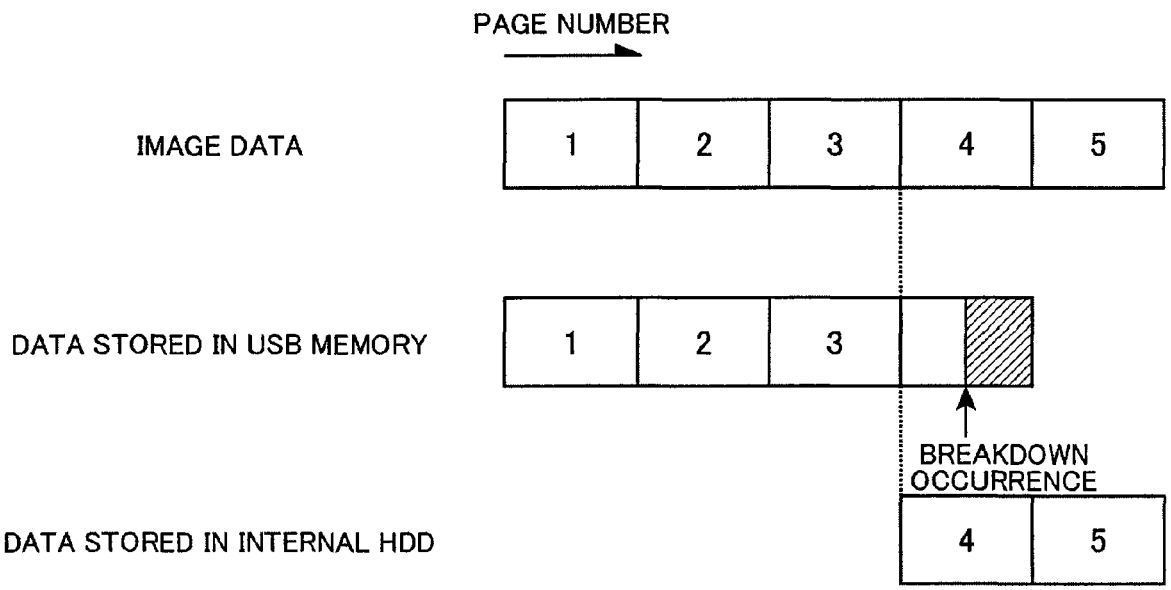
FIG. 9 is a diagram showing a storing example of image data in the multi-function peripheral according to the second embodiment of the invention.

FIG. 9 is a diagram showing a storing example of the image data. If the scanner unit 101 reads an original document to obtain data of first to fifth pages as the image data, the image data are sequentially transmitted in accordance with page number information where the data are written into the USB memory 107. As writing into the USB memory goes on, if the user pulls the USB memory 107 out of the multi-function peripheral 200 at a time that the image data corresponding to, e.g., the fourth page are transmitted, the image data corresponding timely to the fourth page become damaged data. At that time, the data from the first to third pages are left in the USB memory 107 as data successfully written. When the user pulls the USB memory 107 out of the multi-function peripheral 200, the program step goes to the processing of S305 in the previous processing, and the HDD 106, as the internal memory device, begins storing the data in lieu of the external memory device. The HDD 106 begins storing from the fourth page image data corresponding to the damaged data, and particularly stores the fourth page and the fifth page in a way to record again from the starting portion of the fourth page image data.

Figure 10:
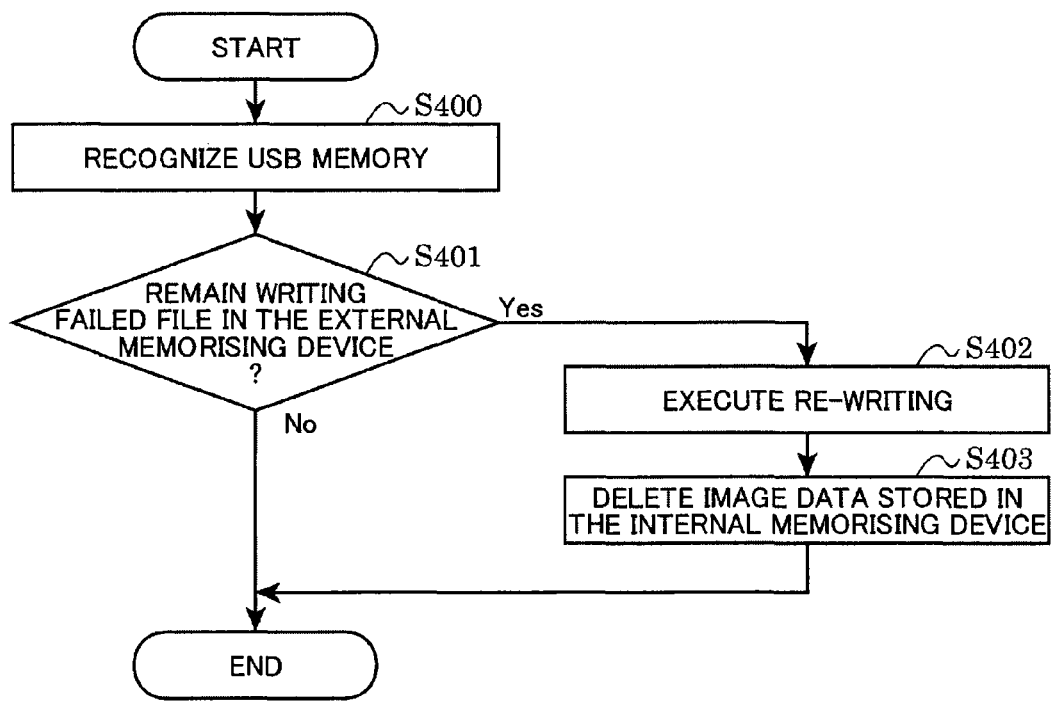
FIG. 10 is a flowchart showing a process in the multi-function peripheral according to the second embodiment of the invention in a case where data in a USB memory are damaged and where the data are to be restored.

If the user thus pulls the USB memory 107 inadvertently out of the multi-function peripheral 200 in a midway of the data transmission, the HDD 106 stores the data from the data corresponding to the page. FIG. 10 is a flow in a case where the data recovery is made after the user pulls the USB memory 107 out of the multi-function peripheral 200 in a midway of the data transmission. Referring to the flow shown in FIG. 10, the example (FIG. 9) in which the fourth page is damaged is described. As shown in FIG. 10, a judgment is first made as to whether the USB memory 107 is connected to the multi-function peripheral 200, and step S400 shows a procedure in which the USB memory 107 is recognized as connected to the multi-function peripheral 200. Where the USB memory 107 is not connected, the USB memory 107 is not recognized, and the respective steps in the flow shown in FIG. 10 do not occur. The processing identification information retrieving unit serving as information retrieving means, not shown, operates to retrieve the stored value in the writing processing flag of the processing identification information storing unit 108 in the USB memory 107, and it is judged as to whether the stored value of the writing processing flag is "1" or not (step S401). The stored value of the writing processing flag in the processing identification information storing unit 108 is either "1" indicating processing of writing or "0" indicating not processing of writing. If the writing processing flag is "1" indicating processing of writing (yes), the processing goes on as a writing failed file exists. If the writing processing flag 112 is "0" indicating not processing of writing (no), the processing is made to end.

If the writing processing flag is "1" indicating processing of writing (yes), re-writing is executed at step S402. In this re-writing processing, though data are transmitted from the HDD 106 to the USB memory 107, data are transmitted in a way to overwrite the damage fourth page image data, and the first to fifth page of the original image data come to be stored at the end of the data transmission. At the end of the data transmission, the storing value of the writing processing flag of the processing identification information storing unit 108 is renewed to "0", and it shows a status that no writing failed file exists. Subsequently, the fourth page and the fifth page used for overwriting in the USB memory 107 are deleted among the data stored in the HDD 106 serving as the internal memorizing device. The recognition processing on the USB memory is completed by deletion of the data shored in the HDD 106.

As described above, with the multi-function peripheral 200 according to this embodiment, the HDD 106 operable in a substituted fashion stores data dropped out of the USB memory even where some writing failed file is produced in the USB memory due to the USB memory's inadvertently pulling out, the writing failed file can be deleted by overwriting from the damaged page when the USB memory 107 is inserted again. Therefore, it is unnecessary for users to manipulate the deletion operation upon inserting the USB memory to their personal computer to delete the writing failed file, so that useless files can be deleted surely in a short time.

It is to be noted that although in this embodiment it is describe that the image data can be overwritten by a page basis, the apparatus can adapt a system doing re-writing by other image unit basis. The multi-function peripheral 200 according to the second embodiment can be formed with a prescribed display unit, and damaged pages among the image data can be shown. In the embodiments described above, the apparatuses having the scanner function, facsimile function, photocopier function, and printer function are described, but any apparatus can be used for the embodiments as far as the apparatus having a scanner function, and it is not necessary for the multi-function peripheral to have respective functions other than the scanner function. Display of the writing failure at the display unit is not necessarily in texts and can be in forms of icons or illustrations.

With the multi-function peripherals according to the embodiments, the peripherals may have plural USB terminals; the internal memorizing device can be a part of an HDD used for photocopier other than the HDD described above; the internal memorizing device itself can be such as, e.g., a memory card, an extended memory, and a memorizing medium in a disc shape; the internal memorizing device can be formed of a server connected through LAN or WAN or formed inside other personal computer.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated.

It is intended that the scope of the invention should not be limited by the specification, but be defined by the claims set forth below.

What is claimed is:

1. An image processing apparatus comprising:
a data writing section for writing data to an external memory medium, wherein the data writing section writes writing processing indicating that writing is not yet completed to the external memory medium prior to completion of writing the data to the external memory medium, and clears the writing processing information upon completion of writing the data to the external memory medium.

2. The image processing apparatus according to claim 1, further comprising an information retrieving section for retrieving the writing processing information from the external memory medium when the external memory medium is detected as attached; and
a data deleting section for deleting the data that writing is not yet completed from the external memory medium based on the writing processing information retrieved at the information retrieving section.

3. The image processing apparatus according to claim 2, further comprising
a control section for receiving an instruction for deleting the data that writing is not yet completed from the external memory medium according to the user's operation, wherein the data deleting section deletes the data that writing is not yet completed from the external memory medium upon receipt of the instruction.

4. The image processing apparatus according to claim 3, further comprising a display section for displaying information of that the data that writing is not yet completed exist in the external memory medium, based on the writing processing information retrieved by the information retrieving section.

5. The image processing apparatus according to claim 1, wherein the data writing section writes the data as a file to the external memory medium, the data writing section writes to the external memory medium by corresponding the file with the writing processing information.

6. The image processing apparatus according to claim 1, wherein the external memory medium is a USB memory or a memory card.

7. The image processing apparatus according to claim 1, wherein the data is image data.

8. The image processing apparatus according to claim 1, wherein the writing processing information is changed to information that indicates that the writing is completed when the writing processing information is cleared.

9. The image processing apparatus according to claim 1, wherein the data writing section clears the writing processing information by transmitting a signal for renewal of the writing processing information to the external memory medium.

* * * * *